United States Patent
Scholze et al.

(10) Patent No.: US 7,346,197 B2
(45) Date of Patent: Mar. 18, 2008

(54) METHOD OF IMPROVING FINGERPRINT IMAGES

(75) Inventors: Steffen Scholze, Hamburg (DE); Alexander Schwarz, Hamburg (DE)

(73) Assignee: NXP B.V., Eindhoven (NL)

( * ) Notice: Subject to any disclaimer, the term of this patent is extended or adjusted under 35 U.S.C. 154(b) by 645 days.

(21) Appl. No.: 10/512,868

(22) PCT Filed: Mar. 17, 2003

(86) PCT No.: PCT/IB03/00951

§ 371 (c)(1), (2), (4) Date: Sep. 20, 2004

(87) PCT Pub. No.: WO03/079274

PCT Pub. Date: Sep. 25, 2003

(65) Prior Publication Data

US 2005/0163394 A1    Jul. 28, 2005

(30) Foreign Application Priority Data

Mar. 20, 2002 (DE) .............................. 102 12 277

(51) Int. Cl.
*G06K 9/00* (2006.01)
*G05B 19/00* (2006.01)

(52) U.S. Cl. ............... 382/124; 340/5.53; 713/186

(58) Field of Classification Search ........ 382/115–127; 340/5.1, 5.2, 5.52, 5.53; 902/3; 356/71; 713/186

See application file for complete search history.

(56) References Cited

U.S. PATENT DOCUMENTS

| | | | | |
|---|---|---|---|---|
| 5,659,626 | A | * | 8/1997 | Ort et al. ............. 382/125 |
| 5,799,098 | A | * | 8/1998 | Ort et al. ............. 382/125 |
| 5,926,555 | A | * | 7/1999 | Ort et al. ............. 382/124 |
| 7,142,699 | B2 | * | 11/2006 | Reisman et al. ....... 382/124 |
| 2005/0163394 | A1 | * | 7/2005 | Scholze et al. ........ 382/260 |
| 2005/0232472 | A1 | * | 10/2005 | Scholze .............. 382/124 |
| 2006/0210123 | A1 | * | 9/2006 | Kondo et al. ......... 382/117 |

OTHER PUBLICATIONS

Hong, L. et al: "Fingerprint Image Enhancement: Algorithm and Performance Evaluation" IEEE Transactions on Pattern Analysis and Machine Intelligence, IEEE Inc. New York, US vol. 20, No. 8, Aug. 1, 1998, pp. 777-789.

Greenberg S, et al: "Fingerprint Image Enhancement Using Filtering Techniques" Pattern Recognition, 2000. Proceedinds, 15TH International Conference on Sep. 3-7, 2000, IEEE Comput. Soc., US, Sep. 3, 2000.

Jiang, X: " A Study of Fingerprint Image Filtering" Proceedings 2001 International Conference on Image Processing. ICIP 2001. Thessaloniki, Greece, Oct. 7-10, 2001, IEEE, vol. 3 of 3, Conf. 8, Oct. 7, 2001.

* cited by examiner

*Primary Examiner*—Aaron W Carter
(74) *Attorney, Agent, or Firm*—Peter Zawilski

(57) ABSTRACT

In a method of improving fingerprint images, wherein recorded images are processed on image areas of the fingerprint images by using Gabor filters, the Gabor filters are adapted to characteristic quantities of the image in the relevant image area to be processed.

8 Claims, 3 Drawing Sheets

METHOD OF IMPROVING FINGERPRINT IMAGES

Figure 1A:

The invention relates to a method of improving fingerprint images, wherein recorded images are processed on image areas of the fingerprint images by using Gabor filters.

Of the methods currently used to allow clear identification of different fingerprints with maximum reliability, most work on the basis of extraction of minutiae and comparison of position and, where applicable, nature and direction of the minutiae found. Minutiae are branches and ends of individual grooves in the fingerprint. The minutiae are extracted from a given fingerprint using known image processing methods. Errors in the production of fingerprint images hinder the detection of minutiae. Such errors can, for example, arise from different composition of the finger surface at the time of photographing, for example, sweat, dirt, dryness and the like.

U.S. Pat. No. 5,659,626 discloses a fingerprint identification system in which processing is performed in accordance with the type of the main claim using Gabor filters. Gabor filters are described further in Lin Hong, Yifei Wan, and Anil Jain: "Fingerprint Image Enhancement: Algorithm and Performance Evaluation", IEEE Transactions on Pattern Analysis and Machine Intelligence, Vol. 20. 8, Aug. 1998.

These methods indeed give an essential improvement in fingerprint images for subsequent image analysis. It has, however, been found that the results are not always good for all variants of fingerprints and parts thereof.

Therefore, according to the invention, to further improve fingerprint images, the Gabor filters are adapted to characteristic quantities of the image in the relevant image area to be processed.

In order to be able to extract suitable characteristic quantities from the content of the image areas for adaptation of parameters, the method according to the invention is preferably characterized in that the image areas are square and have a side length at which the spacing and direction changes of the grooves are relatively small but comprise several grooves, such that statistical mean values and the standard deviations can be formed for the spacings and directions.

An essential improvement in fingerprint images is achieved by an advantageous embodiment of the method according to the invention in the adaptation of the image area to be processed is determined by the following characteristic quantities:
mean direction of the grooves in the image area,
mean spacing of the grooves in the image area,
change of direction of the grooves in the image area, and
change of spacing of the grooves in the image area.

The method according to the invention is particularly characterized in that, of an ellipse which encloses a Gaussian bell curve representing the Fourier transform of the Gabor filter, the length of the main axis directed towards the origin increases as the spacing of the grooves decreases, the length of the other main axis increases as the direction change increases, and the intersection of the main axes is determined by the mean direction and mean frequency of the grooves in the relevant image area.

When combining the image areas distorting artifacts which are due to the filtration varying from image area to area may occur in the peripheral areas of the individual Gabor-filtered image areas, which artifacts affect further image processing. Therefore, in a refinement of the method according to the invention, the image areas overlap and before being combined, the overlapping image areas are weighted with a function decreasing towards the edges. It is thereby achieved that these artifacts disappear or are minimized and hence have no negative effects on the required quality of the overall Gabor-filtered image recombined from the individual tiles.

These and other aspects of the invention are apparent from and will be elucidated with reference to the embodiments described hereinafter.

Figure 1B:
Figure 2A:
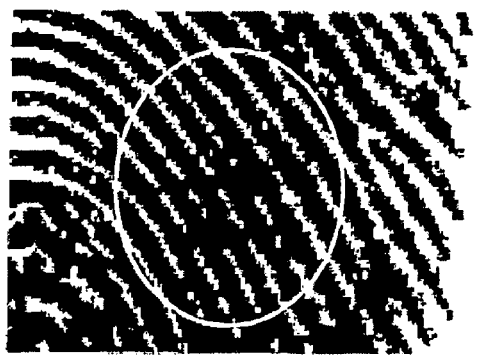
Figure 2B:
Figure 3:
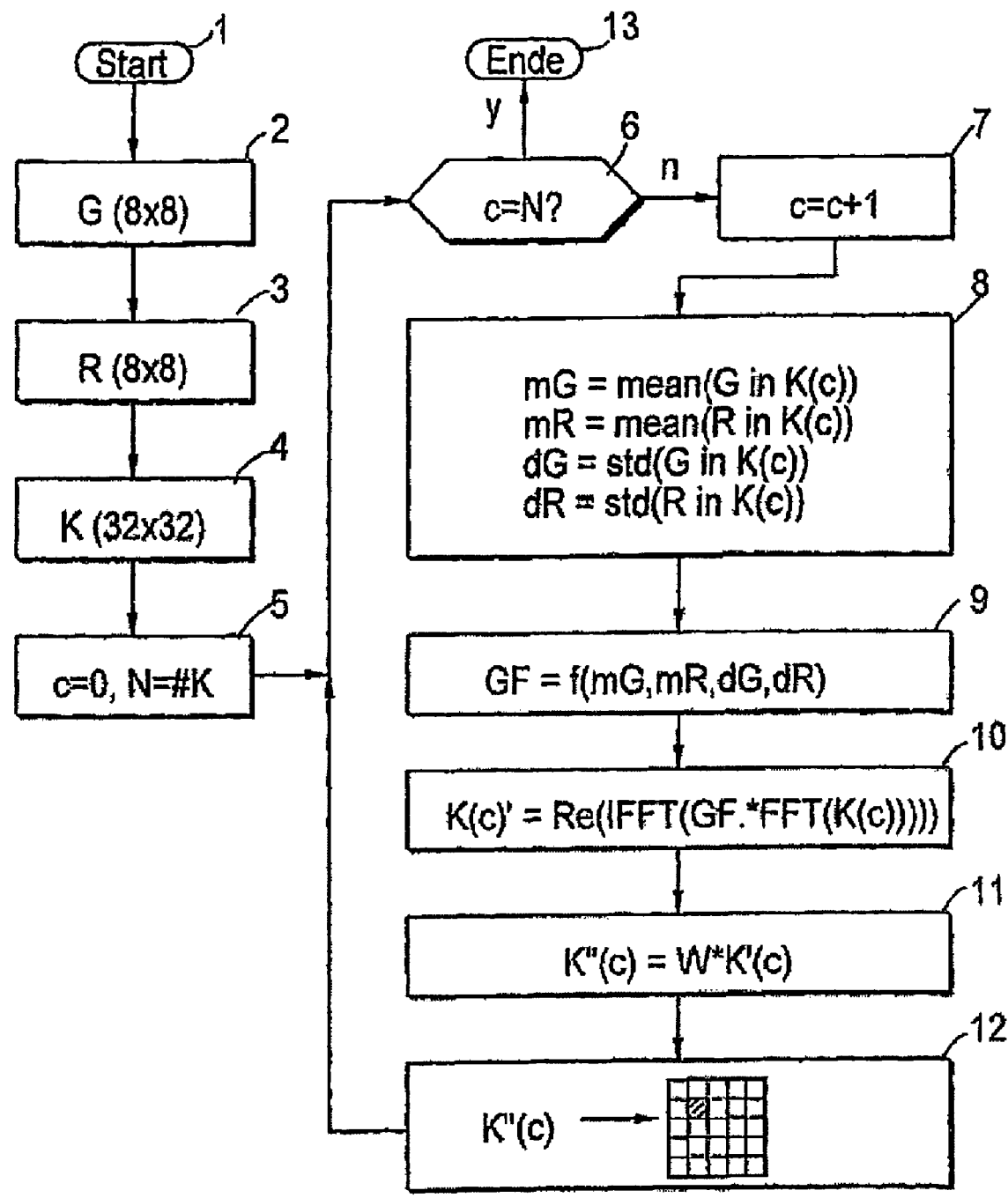
Figure 4A:
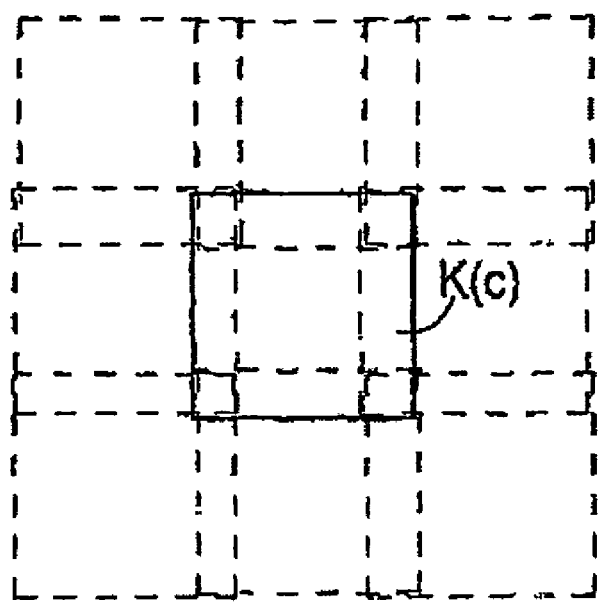
Figure 4B:
Figure 5:
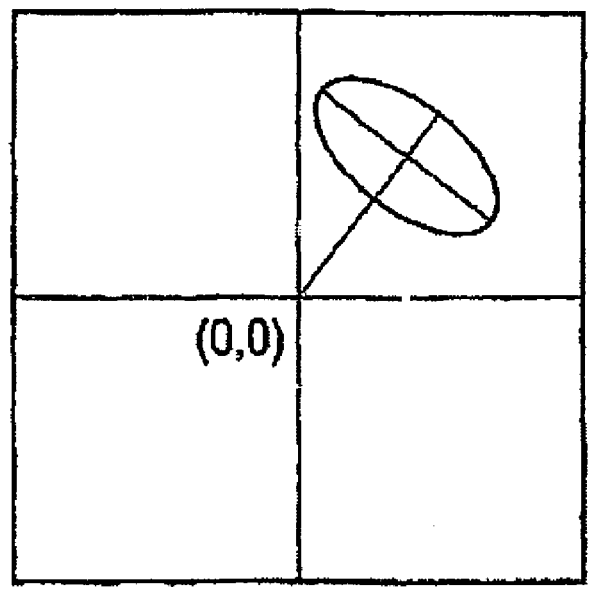

In the drawings:

FIG. 1a and FIG. 1b show fingerprint images before and after processing by means of the method according to the invention with the result of an improved groove contour, FIG. 2a and FIG. 2b show fingerprint images before and after processing by means of the method according to the invention with the result of an improved groove separation, FIG. 3 shows a flow chart to explain the method according to the invention, FIG. 4a and FIG. 4b show views to explain the combining of tiles, and FIG. 5 shows a plan view of the FFT-transform of a square quadratic image area.

Because of the specifications for patent drawings which state that the figures must not contain gray shades, the fingerprint images in FIGS. 1 and 2 are shown largely as pure black/white images.

FIG. 1a shows an unprocessed fingerprint with an error point caused, for example, by a scratch on the surface of the scanner. The interrupted grooves are repaired (FIG. 1b) with Gabor filters adapted optimally according to the method of the invention.

FIG. 2 demonstrates a second property of the method according to the invention: separation of the distorting wash-out of the grooves due to harmful environmental influences in the marked areas of the sensor image (FIG. 2a). Here, FIG. 2b shows the fingerprint after processing with the Gabor filters optimally adapted by means of the invention.

To perform the method according to the invention in accordance with the flow chart shown in FIG. 3, a corresponding computer program can be run on a computer. After a start at 1, the calculation of local gradients G is performed on a suitable grid of, for example, 8×8 pixels. In a step 3, local groove spacings R are also calculated on the suitable grid. At 4, the fingerprint image is divided into tiles K of suitable size. A suitable size is, for example, 32×32 pixels for a sensor-induced image resolution of 500 dpi.

In program step 5, a counter c is initialized, i.e. set to zero. The number of tiles is also initialized with N=#K. After a query 6 whether c=N, if not applicable c is incremented at 7. Then, at 8, parameters are calculated for construction of the Gabor filter according to the characteristic quantities. Here, mean is the mean value and std is the standard deviation. At 9, the Gabor filter GF for the tile K(c) is constructed as a function of the parameters calculated in 8.

In program step 10, the Gabor filter GF concerned is applied to the tile K(c), where for filtration the fast-Fourier-transformed (FFT) tile K(c) is multiplied elementary element with the Gabor filter GF. The result is inversely transformed (IFFT) and the real part forms the improved content K(c)' of tile K(c). At 11, the results of program step 10 are evaluated with a function W which will be explained in more detail below with reference to FIG. 4. In program step 12, the filtered and evaluated content K"(c) of tile K(c) is then inserted in the resulting improved fingerprint image.

After this program step, it is checked at 6 again whether c has reached value N. If this is not yet the case, method steps 7 to 12 are performed for the following tile. After all tiles have been processed, the program ends at 13.

When combining the image areas, distorting artifacts, which are due to the filtration which differs from image area to image area, may occur in the peripheral areas of the individual Gabor-filtered image areas, which artifacts affect the further image processing. Therefore, according to FIG. 4, the image areas overlap and, before being combined, the overlapping image areas are weighted with a function decreasing towards the edges. It is thereby achieved that these artifacts disappear or are minimized and hence have no negative effects on the required quality of the overall Gabor-filtered image recombined from the individual tiles. FIG. 4a shows a tile K(c), and in dotted lines, the adjacent tiles which each overlap. FIG. 4b shows an example of a weighting function W as a function of distance x. Whereas in the central area of the tiles a maximum weighting is applied, this diminishes in the overlap areas up to the edges.

In the frequency range, a Gabor filter consists of a two-dimensional Gaussian bell curve which, in the plan view in FIG. 5, is surrounded by an ellipse. A main axis of the ellipse in the case shown is in principle aligned to the center point of the filter mask. This main axis in the view of the filter lies in the spatial area of the normals to the wavefront. Thus, the four parameters of direction, direction change, frequency and frequency change determine the position and form of the ellipse.

The center point of the ellipse describes the maximum of the bell curve and lies precisely at the intersection of frequency and direction. The frequency space is viewed as follows: The origin lies in the center of the Gabor filter and can be described with the amplitude of the equal part. Concentric circles about the origin (0,0) contain the same frequency in different directions, where the frequency is limited at the outer edge by the FFT-specific limit frequency. In this simplified view, the imaginary part of both the transform and the inverse transform is disregarded. Thus, the frequency space can be regarded as the polar co-ordinate representation of frequency and direction.

A possible type of calculating a Gabor filter adapted according to the invention is explained below. The implementation has size 32×32 for the square FFT/IFFT tiles K. The Gabor filter in the frequency area is formed pixel by pixel for:

$$(x, y) \in \left[-1, -1+\frac{1}{16}, -1+\frac{2}{16}, -1+\frac{3}{16}, \ldots, -1+\frac{(32-1)}{16}\right]^2$$

and as follows:

$$GF(x, y) = \exp\left(-\frac{1}{2} v^T A^{-1} v\right) \quad [1]$$

with $$v = \begin{pmatrix} x \\ y \end{pmatrix} - \frac{1}{mR}\begin{pmatrix} \cos mG \\ \sin mG \end{pmatrix},$$

where mR is the mean groove spacing and mG is the mean direction of the groove to the inner part of the tile being processed, calculated, for example, by means of $$mR = \frac{1}{\#M} \sum_{m_1, m_2 \in M} R(x+m_1, y+m_2) \quad [2]$$

where M is the quantity of elements of R existing on the tile.

For tile size 32 equation [2] becomes $$mR = \frac{R(x+12, y+12) + R(x+12, y+20) + R(x+20, y+12) + R(x+20, y+20)}{4} \quad [3]$$

with (x,y) as co-ordinates of the top left-hand corner of the tile processed in each case.

The value mG can be taken e.g. directly from a suitably smoothed grid of directions, as the innermost grid point of G in the tile being processed. This can be performed instead of the mean value formation and is possible because of the previously performed smoothing of the direction grid and prevents a complex mean value formation of the directions.

Matrix A in [1] is derived from $$A = \begin{pmatrix} \cos mG & -\sin mG \\ \sin mG & \cos mG \end{pmatrix} \begin{pmatrix} \sigma_x^{-2} & 0 \\ 0 & \sigma_y^{-2} \end{pmatrix} \begin{pmatrix} \cos mG & \sin mG \\ -\sin mG & \cos mG \end{pmatrix} \quad [4]$$

where parameters $\sigma_x$ and $\sigma_y$ of R, G, mR and mG can be derived e.g. as follows:

$$\sigma_x = \max\left\{20\left(1 - 2\frac{mG}{\pi}\right)^2, 4\right\} \text{ and } \sigma_y = \max\left\{3, \frac{\sigma_x}{2(3^{\frac{1}{mR}})}\right\} \quad [5]$$

The invention claimed is:

1. A method of improving fingerprint images, wherein recorded images are processed on image areas of the fingerprint images by using Gabor filters, characterized in that the Gabor filters are adapted to characteristic quantities of the image in the relevant image area to be processed, and characterized in that the adaptation of the image area to be processed is determined by the following characteristic quantities:
   mean direction of grooves in the image area,
   mean spacing of the grooves in the image area,
   change of direction of the grooves in the image area, and
   change of spacing of the grooves in the image area.

2. A method as claimed in claim 1, characterized in that the image areas are square and have a side length at which spacing and direction changes of the grooves are relatively small but comprise several grooves, such that statistical mean values and standard deviations can be formed for the spacings and directions.

3. A method as claimed in claim 1, characterized in that, of an ellipse which encloses a Gaussian bell curve representing the Fourier transform of the Gabor filter, the length of the main axis directed towards the origin increases as the spacing of the grooves decreases, the length of the other main axis increases as the direction change increases, and the intersection of the main axis is determined by the mean direction and mean frequency of the grooves in the relevant image area.

4. A method as claimed in claim 1, characterized in that the image areas overlap and before being combined, the overlapping image areas are weighted with a function decreasing towards the edges of the image areas.

5. A method of improving fingerprint images, wherein recorded images are processed on image areas of the fingerprint images by using Gabor filters, characterized in that the Gabor filters are adapted to characteristic quantities of the image in the relevant image area to be processed, and characterized in that the image areas overlap and before being combined, the overlapping image areas are weighted with a function decreasing towards the edges of the image areas.

6. A method as claimed in claim 5, characterized in that the image areas are square and have a side length at which spacing and direction changes of grooves in the image areas are relatively small but comprise several grooves, such that statistical mean values and standard deviations can be formed for the spacings and directions.

7. A method as claimed in claim 5, characterized in that the adaptation of the image area to be processed is determined by the following characteristic quantities:
mean direction of grooves in the image area,
mean spacing of the grooves in the image area,
change of direction of the grooves in the image area, and
change of spacing of the grooves in the image area.

8. A method as claimed in claim 7, characterized in that, of an ellipse which encloses a Gaussian bell curve representing the Fourier transform of the Gabor filter, the length of the main axis directed towards the origin increases as the spacing of the grooves decreases, the length of the other main axis increases as the direction change increases, and the intersection of the main axis is determined by the mean direction and mean frequency of the grooves in the relevant image area.

* * * * *